United States Patent Office 2,976,288
Patented Mar. 21, 1961

2,976,288

TRIAZINE DERIVATIVES

Joseph Green, London, David McHale, Epsom, and Patrick Mamalis, Tadworth, England, assignors to Vitamins Limited, London, England, a British company No Drawing. Filed Aug. 18, 1958, Ser. No. 755,406

Claims priority, application Great Britain Sept. 16, 1957

6 Claims. (Cl. 260—249.9)

This invention relates to novel substances useful as bactericidal agents and has as an object to provide new substituted 1-hydroxy-4:6-diamino-1:2-dihydro-s-triazines which possess bactericidal properties and a process for the manufacture of the said new substituted 1-hydroxy-4:6-diamino-1:2-dihydro-s-triazines.

The present invention provides new bactericidal substances of the general formula:

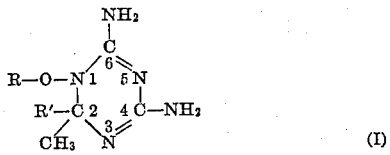

(I)

wherein R is an alkyl radical which may be straight chain or branched chain and which contains from seven to sixteen carbon atoms inclusive or an arylalkyl radical of the general formula $X.C_6H_4.CH_2.$ or of the general formula $X.C_{10}H_6.CH_2.$ in which X is hydrogen, a methyl radical or a halogen atom and R' is hydrogen or a methyl radical, and salts thereof.

The present invention also includes a process for the manufacture of the new bactericidal substances of the present invention which comprises reacting an N-arylalkyl-oxydiguanide of the general formula:

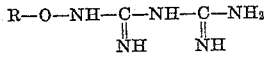

in which R has the meaning given above, with a carbonyl compound of the general formula:

where R' has the meaning given above in the presence of an acid catalyst. For optimum yields of product, at least one molecular equivalent of acid is used.

The carbonyl compounds may be used alone without solvent or diluent, or in a solvent such as a lower aliphatic alcohol.

The substances are usually obtained in the form of their salts but they can, of course, be converted into the free base by treatment with an alkali such as sodium hydroxide.

Preferred compounds are 1-n-decyloxy-4:6-diamino-1:2-dihydro-2:2-dimethyl-s-triazine, 4:6-diamino-1:2 - dihydro-2:2-dimethyl-1-n-dodecyloxy - s - triazine, 4:6 - diamino-1:2-dihydro-2:2-dimethyl-1-n-nonyloxy-s - triazine, 4:6-diamino-1:2-dihydro-2:2-dimethyl - 1 - (1' - naphthylmethoxy)-s-triazine and 4:6-diamino-1:2-dihydro-2:2-dimethyl-1-(2'-naphthylmethoxy)-s-triazine, and salts of these compounds.

As stated above, the new substances of the present invention are useful as bactericides and we have found that they possess high activity when tested in vitro against organisms such as Staphylococcus aureus, Streptococcus pyogenes, Corynebacterium diphtheriae, Escherichia coli, Pseudomonas aeruginosa, Ebethella typhosa and Klebsiella pneumoniae and may therefore be useful in medical, surgical and veterinary practice.

The following examples, in which the parts are by weight, illustrate the invention:

EXAMPLE 1

To a suspension of 103 parts of N-n-decyloxydiguanide in 750 parts of acetone were added 52 parts of concentrated hydrochloric acid, the solid passing into solution. The mixture was heated under reflux for 4 hours and concentrated by distillation. The white solid which separated on cooling was collected and dried, M.P. 196–197° C. Crystallisation from acetone containing a little ethyl alcohol gave colourless needles, M.P. 198–200° C. of 1-n-decyloxy-4:6-diamino-1:2-dihydro-2:2-dimethyl - s - triazine monohydrochloride. The substance formed a picrate, yellow needles from alcohol, M.P. 193–194° C.

EXAMPLE 2

A mixture of 20 parts of N-n-dodecyloxydiguanide dihydrochloride, 150 parts of acetone and 50 parts of alcohol was heated under reflux for 8 hours. Evaporation of the solvents afforded a gum which solidified on trituration with acetone. 4:6-diamino-1:2-dihydro-2:2-dimethyl-1-n-dodecyloxy-s-triazine hydrochloride crystallised from acetone-alcohol as white needles, M.P. 200° C.

EXAMPLE 3

A mixture of 17.5 parts of N-n-tetradecyloxydiguanide monohydrochloride, 4 parts of concentrated hydrochloric acid and 150 parts of acetone were heated at the reflux temperature for 8 hours. After removal of a trace of insoluble material, the filtrate was cooled when white solid separated. Crystallisation from acetone-alcohol yielded 4:6 - diamino-1:2-dihydro-2:2-dimethyl-1-n-tetradecyloxy-s-triazine hydrochloride, M.P. 196–197° C.

EXAMPLE 4

A mixture of 51 parts of N-n-decyloxydiguanide, 26 parts of concentrated hydrochloric acid, 117 parts of acetaldehyde and 350 parts of alcohol was heated under reflux for 2 hours. Evaporation of the solvents left a colourless gum which solidified on trituration with dry ether-acetone (1:1). The solid was collected and crystallised from acetone-alcohol when 1-n-decyloxy-4:6-diamino-1:2-dihydro-2-methyl-s-triazine hydrochloride separated as needles, M.P. 205–206° C. The derived picrate formed needles, M.P. 178–179° C.

The following additional compounds of the present invention (Examples 5 to 20) were also prepared by methods analogous to those of the preceding Examples. These compounds are of the general Formula I, the values of R and R' being as stated in the table.

Table

| Ex. | R | R' | M.P. of monohydrochloride | M.P. of picrate |
|---|---|---|---|---|
| 5 | H | CH$_3$ | 237° C. (decomp.) | |
| 6 | CH$_3$ | CH$_3$ | 227–228° C. | |
| 7 | C$_3$H$_5$ | CH$_3$ | 232–233° C. | |
| 8 | n-C$_3$H$_7$ | CH$_3$ | 214° C. | |
| 9 | n-C$_4$H$_9$ | CH$_3$ | 206–207° C. | |
| 10 | n-C$_6$H$_{13}$ | CH$_3$ | | 204–206° C. |
| 11 | n-C$_7$H$_{15}$ | CH$_3$ | 201° C. | 186–187° C. |
| 12 | n-C$_8$H$_{17}$ | CH$_3$ | 205–206° C. | |
| 13 | n-C$_9$H$_{19}$ | CH$_3$ | 220–222° C. | 180–181° C. |
| 14 | n-C$_{16}$H$_{33}$ | CH$_3$ | 187–190° C. | |
| 15 | C$_6$H$_5$.CH$_2$ | CH$_3$ | 219–220° C. | 207–208° C. |
| 16 | 1-naphthylmethyl | CH$_3$ | 215° C. | |
| 17 | 2-naphthylmethyl | CH$_3$ | 231–232° C. | |
| 18 | p-CH$_3$.C$_6$H$_4$.CH$_2$ | CH$_3$ | 245° C. | |
| 19 | p-Cl.C$_6$H$_4$.CH$_2$ | CH$_3$ | 243° C. | |
| 20 | p-Br.C$_6$H$_4$.CH$_2$ | CH$_3$ | 225° C. | |

What we claim is:

1. A compound selected from the group consisting of substituted triazines of the formula

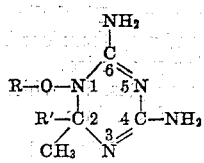

and non-toxic salts thereof, wherein R is selected from the group consisting of alkyl radicals containing from 7 to 16 carbon atoms, benzyl, chlorobenzyl, bromobenzyl, benzyl methyl, naphthyl, naphthyl methyl, and methoxy naphthyl radicals and R' is selected from the group consisting of the hydrogen atom and methyl radical.

2. 1 - n - decyloxy - 4:6 - diamino - 1:2 - dihydro - 2:2 - dimethyl-s-triazine.

3. 4:6 - diamino - 1:2 - dihydro - 2:2 - dimethyl - 1 - n-dodecyloxy-s-triazine.

4. 4:6 - diamino - 1:2 - dihydro - 2:2 - dimethyl - 1 - n-nonyloxy-s-triazine.

5. 4:6 - diamino - 1:2 - dihydro - 2:2 - dimethyl - 1-(1'-naphthylmethoxy)-s-triazine.

6. 4:6 - diamino - 1:2 - dihydro - 2:2 - dimethyl - 1-(2'-naphthylmethoxy)-s-triazine.

References Cited in the file of this patent

UNITED STATES PATENTS

| | | |
|---|---|---|
| 2,803,628 | Crowther | Aug. 20, 1957 |
| 2,897,116 | Hitchings et al. | July 28, 1958 |